United States Patent [19]

Cooperrider

[11] Patent Number: 5,325,254
[45] Date of Patent: Jun. 28, 1994

[54] THIN FILM INDUCTIVE TRANSDUCER HAVING IMPROVED YOKE AND POLE TIP STRUCTURE

[75] Inventor: Paul H. Cooperrider, Boise, Id.

[73] Assignee: Hewlett-Packard Company, Palo Alto, Calif.

[21] Appl. No.: 76,267

[22] Filed: Jun. 11, 1993

Related U.S. Application Data

[63] Continuation of Ser. No. 810,736, Dec. 18, 1991, abandoned.

[51] Int. Cl.$^5$ ............... G11B 5/187; G11B 5/31; G11B 5/23
[52] U.S. Cl. ........................... 360/126; 360/119; 360/122
[58] Field of Search .................... 360/126, 119, 122

[56] References Cited

U.S. PATENT DOCUMENTS

| | | | |
|---|---|---|---|
| 2,813,932 | 11/1957 | Kornei | 360/125 |
| 4,819,111 | 4/1989 | Keel et al. | 360/125 |
| 4,853,815 | 8/1989 | Diepers | 360/126 |
| 4,951,166 | 8/1990 | Schewe | 360/119 |
| 5,130,877 | 7/1992 | Hsie et al. | 360/126 |

FOREIGN PATENT DOCUMENTS

| | | |
|---|---|---|
| 0012912 | 7/1980 | European Pat. Off. . |
| 0452846A2 | 10/1991 | European Pat. Off. . |
| 60-202502 | 10/1985 | Japan ............... 360/126 |

OTHER PUBLICATIONS

IBM Tech. Disk. Bul. vol. 31, No.3, Aug. 1988 "Film Head Structure Optemized For Writing" pp. 291-292 *The whole document*.

Pat. Abstracts of Japan, vol. 1, No. 129, (E-058)25, Oct. 1977, and JPA-52-063711 (Hitachi Seisakusho K. K.) May 26, 1977 *Abstract*.

*Primary Examiner*—Robert S. Tupper
*Attorney, Agent, or Firm*—E. F. Oberheim

[57] ABSTRACT

A thin film magnetic head having a yoke structure comprising a pair of legs, a low reluctance back gap and a high reluctance front gap. The front gap is defined by the pole faces of pole tips which each have a cross-sectional area, in a plane paralleling the pole faces, for limiting magnetic saturation in the yoke structure to regions in the pole tip at and/or adjacent to the front gap. The pole tips define a short throat at the front gap to increase flux density at the gap and each yoke end face or pole tip has a thickness measured in the direction across the front gap which is greater than the thickness of either leg.

4 Claims, 2 Drawing Sheets

THIN FILM INDUCTIVE TRANSDUCER HAVING IMPROVED YOKE AND POLE TIP STRUCTURE

CROSS REFERENCE TO RELATED APPLICATION

This is a continuation of copending application Ser. No. 07/810,736, filed on Dec. 18, 1991, now abandoned.

BACKGROUND OF THE INVENTION

1. Field of the Invention

This invention relates generally to thin film magnetic transducers and more particularly to the magnetic yoke structures of such thin film transducers.

2. DESCRIPTION OF THE RELATED ART

A typical thin film prior art transducer is depicted in FIG. 1 herein. U.S. Pat. No. 4,295,173, Romankiw et. al, describes such a transducer in detail. The practice in the prior art in achieving resolution enhancement has been to provide thin pole pieces $5a$ and $7a$ at the front gap FG or read/write gap, while preventing saturation of the yoke by increasing the cross sectional area of the yoke away from the pole pieces, as in the legs 5 and 7. In reference to FIG. 1, thin film magnetic transducers are conventionally fabricated upon a substrate 1 which upon completion of fabrication has an end face adjacent a media M. The endface functions as a slider and rides on the air bearing, that is, the thin film of air between the slider and the disk surface. The magnetic transducer is fabricated as a thin film structure on the substrate 1 and comprises a magnetic yoke structure having legs 5 and 7. The thin film legs 5 and 7 are joined at the back gap BG. The other ends of the thin film legs 5 and 7, which are the pole pieces $5a$ and $7a$, are of reduced thickness and lesser cross section and are closely spaced to define a front gap FG having a throat measured between the points x and y. The ends of the front gap pole pieces $5a$, $7a$ confront the media M. The thin film legs 5 and 7, in the region between the back gap BG and the front gap FG are spaced apart, and one or more planar coils 8, having coil turns $8a$ are imbedded in an electrically insulating material between these portions of the legs. Passing electrical current through these coils induces a magnetic flux within the yoke. The front gap FG has a throat, the dimension of which extends between the points x and y, the point y being the end of the throat adjacent the media.

This design has been effective for low coercivity media. As linear bit densities increase, higher coercivity media is required. Concomitantly, a thin film inductive transducer must be capable of generating a write field of sufficient magnitude to overwrite the previously written data, so that there are no residual signals from the overwritten data to interfere with the ability to properly read-back the newly written signal, with respect to both the amplitude and phase of that new signal.

The practice of the prior art, to avoid saturation of the yoke structure in a thin film head, has been to increase the cross-sectional area of the yoke structure, especially the legs, in regions away from the pole tips. However, this has not been effective in preventing saturation of the pole structure when fields of high flux density are needed for writing on high coercivity media, especially if the throat height, that is, the dimension between the points x and y, as seen in FIG. 1, is long. Leakage flux, between the confronting faces of the yoke structure along the throat and across the poles in regions $5c$ and $7c$ of FIG. 2, significantly reduces the flux density at the tips of the yoke structure adjacent the media, which is undesirable.

Saturation phenomena, in structures of the type of FIG. 1, is discussed by Keloy and Valstyn, IEEE Transactions On Magnetics, V. Mag-16, # 5, Sept. 1980, pg. 788-790. Saturation has been experienced in practical applications of the prior art, when writing on high coercivity media, where it has been necessary to increase write currents in order to provide flux density at the media sufficient to record well written transitions. Specifically, as higher magnetic fields are required to cause saturation reversal in the media, for recording magnetic transitions, magnetic field densities in the yoke structure of a transducer, having legs and other parts of a given cross sectional area, increases. At some point, these magnetic field densities become large enough to saturate sections of the yoke structures in the regions where the transition is made between the thin film pole pieces, such as $5a$ and $7a$, and the thicker yoke area, such as legs 5 and 7. In this connection, refer to FIG. 2. In FIG. 2, a typical flux path is indicated in a fragmentary portion of the yoke structure, particularly in the regions adjacent the upper end of the throat x,y of the front gap FG. In FIG. 2, the arrows outline the legs 5 and 7, which are not shown, of the yoke structure. The arrow length is generally proportional to the magnitude of magnetization. The arrows approximately indicate the magnetization distribution in gap regions of the head in FIG. 1. Regions of magnetic saturation are illustrated at $5c$ and $7b$. If there is no saturation in the back gap BG and in the legs in other regions than those indicated adjacent the front gap FG, (poles tapered in z direction), the region $7d$ saturates first, and the regions $5c$ and $7c$ saturate as write current is increased.

Thus the structure of FIG. 1, while effective in writing in low coercivity applications, experiences complex magnetic saturation patterns in the yoke structure, at least adjacent the upper end of the throat of the front gap F,G which interferes with the development, or production, of magnetic flux of sufficient intensity, linking a high coercivity medium M, to provide effective writing, or over writing, in the magnetic layer on the media.

SUMMARY OF THE INVENTION

The thin film transducer, according to this invention, overcomes the problems aforesaid, experienced in typical prior art types of thin film transducers, in the provision of a thin film yoke structure of magnetic material of a design which obviates unwanted magnetic saturation. The yoke structure includes two substantially planar legs which are disposed in side by side relationship. Conventionally, this yoke structure is supported upon a suitable substrate, which in a disk drive application functions as a slider which is designed to ride on the air bearing at the disk surface. Thin film layers of magnetic material between the legs at one end define the back gap of the yoke structure and provide a low reluctance magnetic flux path joining the legs. Thin film layers of magnetic material between the legs, at their other ends, define the front gap of the yoke structure and form pole tip layers having confronting pole faces defining a high reluctance front gap. The cross sectional area of each pole tip layer, in a plane paralleling the plane of the pole face thereof, is less than the cross sectional area of the legs or of the low reluctance magnetic flux path. A planar coil having coil turns embedded in electrical insulation between the legs of the yoke structure, in the presence of write current, produces a magnetic field coupled to the yoke to produce a magnetic fringe field at the high reluctance front gap capable of writing magnetic transitions on high coercivity media. This structure minimizes magnetic saturation, in the presence of write current, at locations which would lead to flux leakage away from the gap, minimizes flux leakage between the legs in areas other than between the pole faces at the pole tip layer due to higher writing efficiency, and provides a yoke end face at the pole tips, which in confrontation with the media, reduces amplitude of the negative $H_x$ field at the edge on the end face remote from the high reluctance gap. This improved transducer, for a given write current and magnetomotive force, delivers more flux to the recording media at the front gap than prior art transducers.

BRIEF DESCRIPTION OF THE DRAWINGS

The invention will be better understood by reference to the following specification when considered in conjunction with the accompanying drawings in which.

DESCRIPTION OF THE PREFERRED EMBODIMENT

Figure 1:
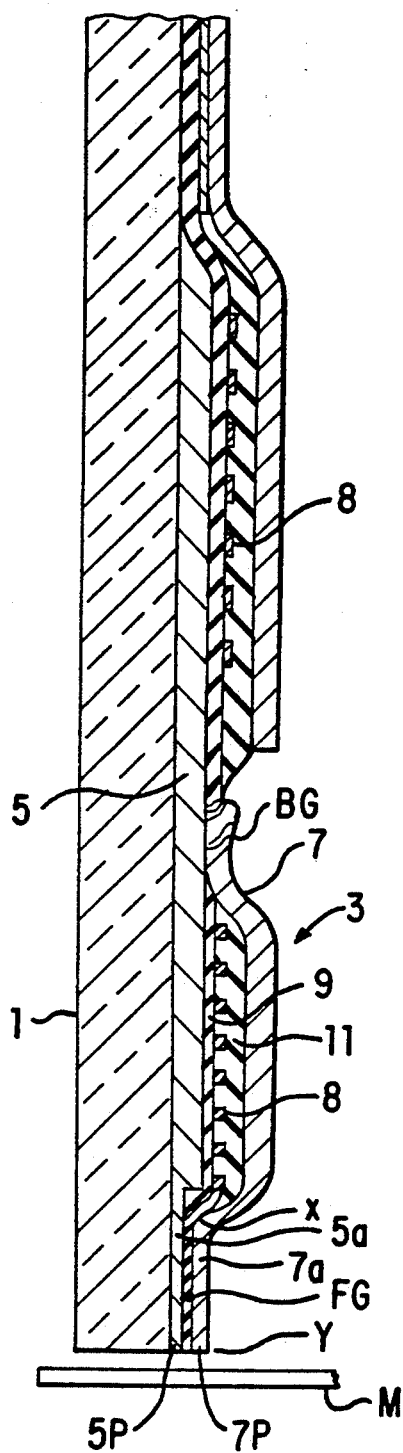
FIG. 1 is a longitudinal cross sectional view of a prior art thin film transducer.

The following equation characterizes the relationship between the magnetic fields and the head geometry.

$$\phi_h = \frac{MMF}{R} \quad 1)$$

In this equation, $\phi_h$ is the flux of the transducing head in the deep gap region. The deep gap region, as referred to herein, in reference to FIG. 1, of the prior art, is the flux in the middle of the front gap FG region at the air bearing surface. MMF is the magnetomotive force, which in applications of the type herein can be approximated by NI which is the write current multiplied by the number of coil turns. R is the reluctance of the magnetic circuit of the yoke, including the legs 5 and 7, and the back gap BG and the front gap FG. In general:

$$\phi_h = B_h \cdot A \quad 2)$$

$$R = \frac{1}{MA} \quad 3)$$

In equations (2) and (3), $B_h$ is the magnetic flux density in the yoke structure, A is the cross sectional area of the magnetic circuit in a plane normal to the $B_h$ field, $(\mu)$ is the permeability of the medium (i.e., yoke material, gap material), and "1" is the length over which $(\mu)$ and A are constant (in the direction of the $B_h$ field). Substituting the right hand expressions of equations (2) and (3) above into (1) above, yields:

$$B_h \cdot A = \frac{NI}{\frac{1}{\mu A}} \quad 4)$$

$$B_h = \frac{Ni\mu_o\mu_r}{1} \quad 5)$$

Figure 2:
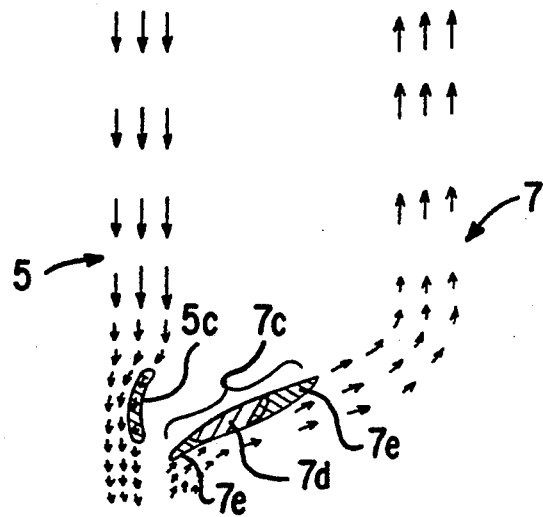
FIG. 2 diagrams a magnetic flux path in a prior art structure of the type of FIG. 1, indicating areas of magnetic flux saturation.

When the yoke structure saturates in the area shown in FIG. 2, $(\mu_r)$ essentially becomes 1. Any further increase in the magnetomotive force, here represented by NI, "sees" the equivalent permeability of air. Consequently, the magnetic head fails to maintain efficiencies in channeling flux to the front gap, that is, the read/write gap adjacent the media, despite substantial increases in the magnetomotive force. With heads that have a relatively long distance, such as the x, y distance, between the area of saturation in the yoke structure and the end of the pole tips 5a, 7a, as in FIG. 1, a substantial drop in the magnetic field available to the media can occur through flux leakage across the pole pieces in the region between the points 5c and 7c, as seen in FIG. 2, especially if the separation between the points 5c and 7c is small. Hughes, Gordon F., in a paper entitled "Thin Film Recording Head Efficiency and Noise", J. Appl. Phys., Vol. 54, # 7, July, 1983, pp. 4168–4173, has developed and presents analytical formula to characterize head efficiencies for thin film heads. If the head saturates at some point $h_1$ away from the end of the pole faces of the pole pieces 5a, 7a, then the field will drop off by:

$$\frac{1}{\cosh(k_1 h_1)} \quad 6)$$

at the ends of the pole pieces, where K1 is the wave number. Consequently, as $K_1$, h1 increases, the head efficiency diminishes exponentially.

Figure 3:
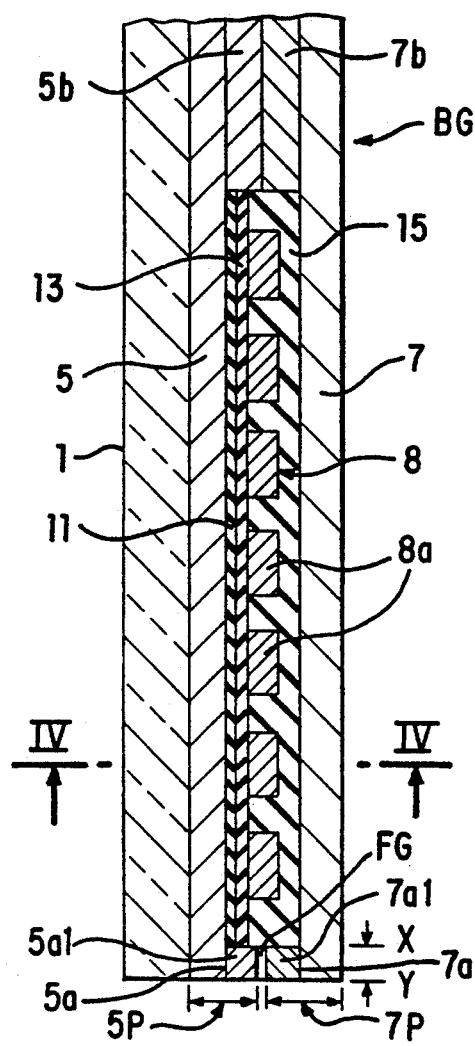
FIG. 3 is a longitudinal cross sectional view of a portion of a thin film transducer embodying the principles of this invention.
Figure 4:
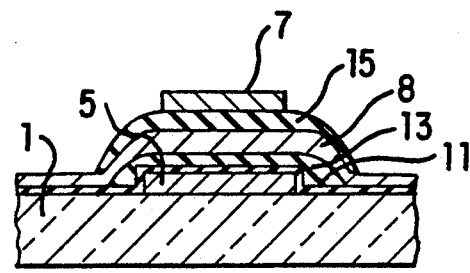
FIG. 4 is a cross sectional view taken on the line IV—IV of FIG. 3.

To prevent saturation of the yokes in locations removed from the pole tips 5a, 7a, it is desirable to have a high reluctance path between the legs 5 and 7 of the yoke structure, except at the back gap BG, and as close to the pole tips 5a, 7a, as possible. As seen in FIGS. 3 and 4, according to this invention, this can be realized by thick yoke legs 5 and 7 and an even thicker pole tip region 5P and 7P, respectively, which constitute one dimension of the end face of the pole pieces or pole tips 5a and 7a, respectively, as seen in FIG. 3. The increase in the thickness of the pole tip region 5p and 7p must be in the direction of the front gap FG.

With the prior art, as illustrated in FIG. 1, the thickness of the pole tips 5a and 7a is limited by two considerations. The first consideration involves the coil turns 8a which are deposited transversely over the leg on a layer of insulation thereover. There is a marked structural discontinuity at the lateral edges of the bottom leg 5 which presents problems in maintaining adequate conductor thickness while preventing short/bridging between two adjacent turns 8 of the coil. As the thickness of the leg 5 is increased, while holding the thickness of the coil turns constant, the cross sectional dimension of the coil turns 8a at the step at the lateral edge of the leg 5 is decreased. This not only leads to greater head resistance, but is a possible source of electro migration and consequent diminished reliability. Increasing the conductor thickness to compensate for this has two disadvantages:

1. Increased probability of bridging/shorting between two adjacent turns of the coil.
2. Greater difficulty in planarizing the area above the coils. This results in a leg 7 in the yoke structure that has waves and bumps, which may introduce undesirable magnetic domain effects in that leg.

Additionally, the thickness of the legs is limited by the formation of eddy currents in the legs when writing at high frequencies. Maxwell's equations in differential form relating the induced electromotive force to a time varying magnetic field may be written as:

$$\nabla X E = \frac{-\partial B}{\partial t} \quad 7)$$

Maxwell's equation in differential form relating an induced magnetic field from an electric current can be written as:

$$\nabla X H = J + \frac{\partial D}{\partial t} \quad 8)$$

In a conductor this can be written as:

$$\nabla X \frac{B}{\mu_0 \mu_r} = \sigma E \quad 9)$$

Where:
$H = \frac{B}{\mu_0 \mu_r}$ and $J = \sigma E$

Taking the curl of both sides of equation (9) and substituting the right hand side of equation (7) into the right side of equation (9) results in:

$$\nabla^2 B = \mu_0 \mu_r \sigma \nabla X E \quad 10)$$
$$\nabla^2 B = -\mu_0 \mu_r \sigma \frac{\partial B}{\partial t} \quad 11)$$

If, in any segment of the yoke, B is constrained to vary only along a single spatial dimension (i.e., along the direction normal to the edges of the yoke) then $$\frac{d^2 B}{dx^2} = jw\mu_0\mu_r\sigma B \quad 12)$$

for a periodic time varying field with $\omega = 2\pi f$. From this, a skin depth term can be derived:

$$\delta = \frac{1}{\sqrt{\pi f \mu_0 \mu_r \sigma}} \quad 13)$$

such that when $x = \delta$, the magnitude of rar/B/ will have fallen off by 1/e. This is due to the formation of eddy currents in the yoke structure. These eddy currents oppose the time varying fields, rar/B/, in the yokes. This in essence reduces the write efficiency of the head as higher write frequencies are employed. One way to reduce eddy current losses is to laminate the yoke films, separating them by a thin insulating layer. However, this greatly complicates the process of making the yoke films.

In general, the reluctance between the legs 5 and 7 in the yoke structure in the coil region is high enough, due to their physical separation, that present and contemplated thicknesses of the films comprising the yoke are adequate to prevent significant flux leakage across that region as long as the reluctances are significantly lower at the back gap BG and at the pole tip layers 5a1 and 7a1 of the front gap FG, as seen in FIG. 3.

Consequently, the only necessary modifications are at the back gap BG and near the front gap FG. Selective augmentation of yoke thickness in these regions can be realized by using present day thin film deposition and photo lithographic techniques.

The thin film magnetic head of FIGS. 3 and 4 may be fabricated by thin film etching or by lift-off techniques. If etching is chosen, the application of photo resist, masking, exposure and development occur after the deposition of the films. (Etching can be loosely defined to include wet etching, plasma etching, and ion milling). If a lift-off technique is chosen, then the photo resist application, masking, exposure and development, occur before the deposition of the films.

The magnetic head may be fabricated on a substrate or slider 1 which may be of glass, for example. The leg 5 is deposited upon the substrate 1. Defining the shape of the leg occurs by either etching or lift-off techniques. Next, an insulating film 11 is deposited. This film or layer is defined with photolithography such that holes or vias exist at the location of the front and the back gaps, FG and BG respectively. After planarization of the areas in the regions of leg 5, if that is necessary for facilitation of deposition of the second layer on the leg 5, the second layer on the leg 5 is deposited. This second layer comprises the pole tip layer 5a1 and the thin film layer 5b, the latter forming part of the back gap BG. The layers 5a1 and 5b are also defined using etching or lift-off techniques, so that deposited material remains only at the front gap FG and the back gap BG. The insulator layer 11 protects the underlying layer, leg 5, of the yoke structure, in the event etching of the second layer is desired. The fabrication of the planar coil, comprising the coil turns 8, in the dielectric layers 13 and 15, is well known in the prior art. The layer comprising the pole tip layer 7a1 and the thin film layer 7b at the back gap BG is deposited. In this deposition process, a dielectric layer 15 functions as a planarizing layer and deposition and etching or lift off of the layer involving the pole tip layer 7a1 and the thin film layer 7b at the back gap BG is accomplished such that only the front gap FG and the back gap BG have magnetic material remaining, as seen clearly in FIG. 3. Deposition of the thin film layer defining the leg 7 involves definition of its shape in planform. This completes the fabrication process of the yoke structure of the thin film magnetic head seen in FIG. 3, according to this invention, noting particularly the differences in processes relating to building this magnetic head as distinguished from the prior art. Otherwise construction of the magnetic head as a thin film structure uses process steps similar to those of the prior art.

Figure 5:
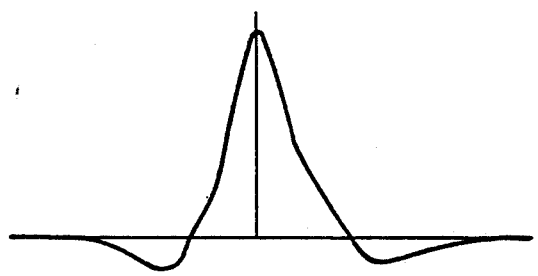
FIGS. 5 and 6 depict readback pulses, FIG. 5 being that of a typical prior art thin film inducer and FIG. 6 being that of a thin film transducer according to this invention.

According to prior art practice, the pole thickness 5P, 7P in the pole tip region is kept thin, as seen in FIG. 1, in the pole tips regions 5a and 7a, to enhance resolution. This is due to intersymbol interference caused by the tails and pre and post undershoots of an isolated read-back pulse from a typical prior art thin film head, as seen in FIG. 5. In prior art practice, employing low coercivity materials, the thinner poles kept the tails of the read back pulse narrow and the negative going excursions, called the undershoots, were kept closer to a line through the peak of the signal, but with the consequence of larger undershoot amplitudes. As long as linear densities are relatively low with respect to the location of these undershoots, their effects are more predictable and can be compensated for. However, as linear densities increase, the large amplitude of the undershoots can affect the readback pulses beyond the adjacent one in more complex interactions, that are difficult to compensate. The use of narrower pulses to minimize intersymbol interference at high linear densities, sacrifices the ability to write well on the media, since a media which is designed to support high linear bit densities generally has a very high coercivity.

Figure 6:
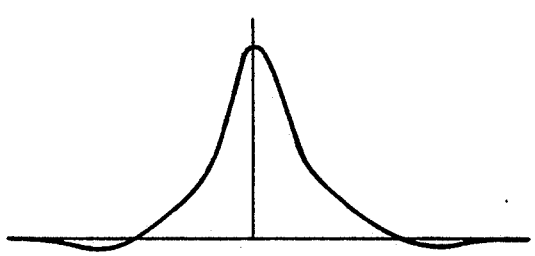

It has been discovered that significantly thicker pole tips ends having enlarged dimensions 5P and 7P, respectively, on opposite sides of the gap FG at the pole tip 5a, 7a significantly reduces the undershoot at the leading and trailing edges of the signal pulse. This is seen clearly in FIG. 6. The end face of the pole tip 5a, 7a of the yoke structure at the front gap FG is significantly larger in the dimension measured in the direction across the gap between the outer edges of the pole edge 5 an 7 and is represented in the sum of the dimensions 5P and 7P plus the gap therebetween. Thus with this end face of the yoke structure positioned adjacent to the surface of the disk, the head field function is such that the stray or fringing flux between the surface of the disk and the outer edges of these ends of the pole faces of dimension 5P, 7P respectively are diminished, which significantly reduces the undershoot at the leading and trailing edges of the read signal pulses, as observed in FIG. 6. Additionally, the pole tip layers 5a1 and 7a1 are designed to have a cross sectional area which is the same as, or preferably less than the cross sectional area of the legs 5 or 7 at the pole face, and significantly less than the cross sectional area in the region of the low reluctance back gap BG. By this expedient the front gap FG has a high reluctance and has a high flux density. Magnetic saturation in the yoke structure in the presence of high writing currents in the coil results only in saturation in the magnetic circuit in the pole tip layers 5a1 and 7a1, in the region adjacent the gap FG between the pole faces of the pole tip layers 5a1 and 7a1.

By employing significantly thicker 5P, 7P pole tips 5a and 7a, it is recognized that the leading and trailing traces of the read pulses are wider than those existing with the prior art magnetic heads. However, the amplitudes of the undershoot in the leading and trailing regions of the read pulse are significantly reduced, diminishing the affects they have on neighboring pulses. Essentially, this characteristic response more closely resembles that of monolithic transducers, in which the pole pieces are so thick, relative to the gap, that the undershoots are practically non-existent and the leading and trailing portions of the pulses take on more of a lorentzian or gaussian curvature. Consequently, with the provision of thick pole pieces, as described herein, the effects of intersymbol interference behave more like monolithic transducers and are not as complicated to compensate.

Although the invention has been described in connection with thin film structures and in connection with specific techniques for fabricating such thin film structures, it will be appreciated that the invention is not limited to thin film fabrication but may be fabricated from individual formed pieces of magnetic material and coils wound about the yokes of such magnetic material.

What is claimed is:

1. A thin film magnetic head, comprising:
   a. a yoke of magnetic material in said magnetic head, said yoke comprising a pair of adjacent thin film legs having spaced substantially parallel coextensive end portions defining respective pole tips having coplanar end faces, said thin film legs each having a thin film layer pole structure defining a pole face between said thin film legs adjacent said end, portions, each pole face being substantially perpendicular to the end face thereat, one pole face confronting the other pole face to define a read/write gap therebetween;
   b. means including a coil encircling said yoke for producing magnetic flux in said yoke and a magnetic field between said pole faces across said gap;
   c. each thin film layer pole structure having a cross-sectional area, in a plane adjacent to and substantially paralleling the pole face thereof, which is less than any cross-sectional area of the leg thereof so that magnetic flux saturation in said yoke occurs in said thin film layer pole structures substantially at a location adjacent said pole faces at said gap.

2. A thin film magnetic head for scanning a magnetic media, comprising:
   a. a substrate.
   b. a yoke structure on said substrate, said yoke structure having a pair of legs;
   c. first and second thin film leg layers of magnetic material in spaced side-by-side relationship defining the legs of said yoke structure, said thin film legs being of a predetermined thickness and having spaced coextensive parallel ends, each end defining a pole tip, the pole tips having coplanar end faces;
   d. first and second thin film back gap layers of magnetic material between said legs at a location removed from said end faces, providing a low reluctance back gap path between said legs of said yoke structure.
   e. each pole tip coprising at least one thin film pole tip layer on each leg between said legs;
   f. a pole face on each said at least one pole tip layer confronting the pole face of the other said at least one pole tip layer, the confronting pole faces defining a read/write gap therebetween having a higher reluctance than said low reluctance back gap path, each said at least one pole tip layer having a cross-sectional area in a plane adjacent to and paralleling the plane of the pole face thereof which is less than any cross-sectional area of said legs, respectively, and
   g. a planar coil having a plurality of coil turns disposed between and insulated from the legs of said yoke structure encircling said yoke at said first and second back gap layers of magnetic material.

3. The invention according to claim 2, in which:
   a. the thin film layers defining the legs are of substantial equal thickness.

4. The invention according to claim 2, in which:
   a. the pole tips are of greater thickness than the predetermined thickness of the legs.

* * * * *